United States Patent
Specht et al.

(10) Patent No.: US 11,203,373 B2
(45) Date of Patent: Dec. 21, 2021

(54) STEERING COLUMN FOR A MOTOR VEHICLE

(71) Applicants: thyssenkrupp Presta AG, Eschen (LI); thyssenkrupp AG, Essen (DE)

(72) Inventors: Jean-Pierre Specht, Haag (CH); Sebastian Huber, Göfis (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/652,793

(22) PCT Filed: Jul. 27, 2018

(86) PCT No.: PCT/EP2018/070391
§ 371 (c)(1),
(2) Date: Apr. 1, 2020

(87) PCT Pub. No.: WO2019/081081
PCT Pub. Date: May 2, 2019

(65) Prior Publication Data
US 2020/0262466 A1 Aug. 20, 2020

(30) Foreign Application Priority Data
Oct. 23, 2017 (DE) .................. 10 2017 218 894

(51) Int. Cl.
*B62D 1/181* (2006.01)
*B62D 1/185* (2006.01)
*F16H 57/039* (2012.01)

(52) U.S. Cl.
CPC ............. *B62D 1/181* (2013.01); *B62D 1/185* (2013.01); *F16H 57/039* (2013.01)

(58) Field of Classification Search
CPC ................................ B62D 1/181; B62D 1/185
See application file for complete search history.

(56) References Cited

U.S. PATENT DOCUMENTS

| 3,252,350 A | * | 5/1966 | Zeigler | ................. B62D 1/181 74/493 |
| 4,602,520 A | * | 7/1986 | Nishikawa | ............. B62D 1/181 280/775 |

(Continued)

FOREIGN PATENT DOCUMENTS

| CN | 201534560 U | 7/2010 |
| CN | 106232455 A | 12/2016 |

(Continued)

OTHER PUBLICATIONS

Machine language translation of DE 102008043905 obtained from espacenet.com on May 7, 2021.*

(Continued)

*Primary Examiner* — James A English
(74) *Attorney, Agent, or Firm* — thyssenkrupp North America, LLC (57) ABSTRACT

A vehicle steering column includes a support unit and by which an actuator unit is held in which a steering spindle is mounted to rotate about a longitudinal axis. An adjustment drive is disposed between the support unit and the actuator unit and by which the actuator unit is adjustable. The adjustment drive has a threaded spindle which engages in a spindle nut and has a spindle axis. The spindle nut and the spindle are drivable by a servomotor to rotate in a mutually relative manner. The servomotor has a motor shaft which is (Continued)

coupled to a drive gear which is rotatable about a drive axis and which operatively engages with an output gear which is rotatable about the spindle axis and is connected in a rotationally fixed manner to the spindle nut or the threaded spindle. The drive axis and the spindle axis are disposed mutually parallel.

20 Claims, 5 Drawing Sheets

(56) References Cited

U.S. PATENT DOCUMENTS

| | | | | |
|---|---|---|---|---|
| 4,691,587 | A | | 9/1987 | Farrand |
| 4,785,684 | A | | 11/1988 | Nishikawa |
| 5,035,446 | A | * | 7/1991 | Arvidsson .............. B62D 1/181 280/775 |
| 5,178,411 | A | * | 1/1993 | Fevre ..................... B62D 1/181 280/775 |
| 5,419,215 | A | | 5/1995 | Herron |
| 5,690,362 | A | | 11/1997 | Peitsmeier |
| 10,501,109 | B2 | * | 12/2019 | Kato ...................... B62D 1/185 |
| 2005/0127655 | A1 | * | 6/2005 | Muramatsu ............ F16F 15/02 280/774 |
| 2016/0132725 | A1 | | 5/2016 | Sakata |
| 2017/0015345 | A1 | | 1/2017 | Galehr |
| 2018/0141581 | A1 | | 5/2018 | Kato |

FOREIGN PATENT DOCUMENTS

| | | | | |
|---|---|---|---|---|
| DE | 12 08 204 | B | | 12/1965 |
| DE | 195 24 196 | C | | 11/1996 |
| DE | 10 2004 052 259 | A | | 6/2005 |
| DE | 102008043905 | A1 | * | 5/2010 ........... B60N 2/0224 |
| DE | 10 2012 211 020 | A | | 1/2014 |
| DE | 10 2013 101 045 | B | | 5/2014 |
| DE | 10 2017 206 551 | A | | 6/2017 |
| DE | 10 2016 200 649 | A | | 7/2017 |
| DE | 10 2017 127 566 | A | | 5/2018 |
| EP | 0 752 359 | A | | 1/1997 |
| GB | 2 304 865 | A | | 3/1997 |
| WO | 2014/000918 | A | | 1/2014 |
| WO | 2017/125311 | A | | 7/2017 |
| WO | 2018/192880 | A | | 10/2018 |

OTHER PUBLICATIONS

English translation of International Search Report issued in PCT/EP2018/070391, dated Oct. 3, 2018.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/070391, filed Jul. 27, 2018, which claims priority to German Patent Application No. DE 10 2017 218 894.4, filed Oct. 23, 2017, the entire contents of both of which are incorporated herein by reference.

FIELD

The present disclosure generally relates to a steering column for a motor vehicle.

BACKGROUND

Steering columns for motor vehicles have a steering shaft having a steering spindle, a steering wheel for introducing a steering command by the driver being attached to the rear end of said steering spindle in terms of the direction of travel, that is to say the end that faces the driver. The steering spindle is mounted in an actuator unit so as to be rotatable about the longitudinal axis of said steering spindle, said actuator unit being held on the vehicle body by a support unit. A longitudinal adjustment can be performed on account of the actuator unit being held in a casing unit, said casing unit being connected to the support unit and also being referred to as a guide box or a boxed swing arm, so as to be displaceable in a telescopic manner in the direction of the longitudinal axis. A height adjustment can be implemented in that the actuator unit, or a casing unit receiving the latter, is mounted so as to pivotable on the support unit. The adjustment of the actuator unit in the longitudinal direction and height direction, respectively, enables an ergonomically correct steering wheel position relative to the driver position to be set in the operative position, also referred to as the driving position or operating position, in which a manual steering intervention can be performed.

For adjusting the actuator unit relative to the support unit, it is known in the prior art to provide a motorized adjustment drive having a drive unit which comprises an electric servomotor which, typically by way of a gearbox, is connected to a spindle drive which comprises a threaded spindle which is screwed into a spindle nut. The threaded spindle and the spindle nut are drivable by the drive unit so as to mutually rotate about an axis, specifically the threaded spindle axis, or in short the spindle axis, on account of which the threaded spindle and the spindle nut can be moved in a translatory manner in the direction of the threaded spindle axis toward one another or away from one another, depending on the rotating direction.

In one embodiment of the adjustment drive the threaded spindle in terms of the rotation about the spindle axis thereof is coupled in a non-rotating matter to the support unit, or alternatively to the actuator unit, and engages in the spindle nut. The spindle nut is drivable by the drive unit, which is connected in a fixed manner to the actuator unit or the support unit, so as to rotate about the axis thereof, the latter corresponding to the spindle axis, but in the direction of the spindle axis is mounted in a fixed manner on the actuator unit, or alternatively on the support unit. The threaded spindle in the direction of the spindle axis is supported on the support unit or on the actuator unit, and the spindle nut in an analogous manner is supported on the actuator unit or the support unit such that the threaded spindle is displaceable in a translatory manner in the direction of the spindle axis in that the spindle nut by the drive unit is driven so as to rotate about the spindle axis such that driving the threaded spindle in a rotating manner causes a translatory, mutually relative, adjustment of the support unit and the actuator unit in the direction of the spindle axis. This embodiment is also referred to as a submerged spindle drive.

In an alternative embodiment the threaded spindle by the drive unit is drivable so as to rotate about the spindle axis of said threaded spindle and engages in the spindle nut which in terms of rotation about the threaded spindle axis is attached in a fixed manner to the support unit, or alternatively to the actuator unit. As in the preceding embodiment, the threaded spindle is supported on the support unit or the actuator unit, and the spindle nut in an analogous manner is supported on the actuator unit, or alternatively on the support unit, such that driving the threaded spindle in a rotating manner, as in the first-mentioned embodiment, causes a translatory, mutually relative, adjustment of the support unit and the actuator unit in the direction of the spindle axis. Therefore, this embodiment is also referred to as a rotating spindle drive.

On account of the threaded spindle or the spindle nut being driven in a rotating manner, a translatory, mutually relative, adjustment of the support unit and the actuator unit in the direction of the spindle axis is caused in both embodiments. In both embodiment, the spindle drive forms a motorized adjustment drive which is effective between the support unit and the actuator unit and by which the actuator unit for adjustment can be adjusted relative to the support unit, wherein the threaded spindle and the spindle nut are movable in a motorized and mutually relative rotary and translatory manner.

In order for a longitudinal adjustment of the actuator unit in the direction of the longitudinal axis of the steering spindle to be implemented, an adjustment drive can be disposed between the actuator unit and a casing unit, also referred to as a guide box or a boxed swing arm, which receives said actuator unit so as to be displaceable in an axial, longitudinal manner, and is connected to the support unit, wherein the spindle axis can be aligned so as to be substantially parallel to the longitudinal axis.

In order for the height to be adjusted, a spindle drive can be disposed between the support unit and an actuator unit which is mounted on said support unit so as to be pivotable in terms of height, or a casing unit in which the actuator unit is received. A motorized longitudinal adjustment and a height adjustment can be configured individually or in combination on a steering column.

A steering column having an adjustment drive of this type is known from DE 10 2017 206 551 A1, for example. The driving action takes place by way of a worm gearbox which is coupled to the servomotor, the drive axis of the drive gear which is configured as a worm shaft being in said worm gearbox transverse to the output axis of the output gear which is configured as a worm gear, said output axis being the spindle axis about which the spindle nut or the threaded spindle rotates, depending on the embodiment. Accordingly, the servomotor, when viewed from the threaded spindle, projects laterally, and bearing assemblies which are mutually transverse are necessary. On account thereof, a relatively large installation space is occupied, in particular in terms of the longitudinal adjustment of a steering column. Moreover, the implementation of the bearings which are dissimilarly oriented in spatial terms and the assembling of the drive gears and output gears is complex.

Thus a need exists for a steering column having an electromotive adjustment drive, at least for the longitudinal adjustment, which requires less installation space and is simpler in terms of implementation.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising a support unit which is attachable to a vehicle body and by which an actuator unit in which a steering spindle is mounted so as to be rotatable about a longitudinal axis is held, and comprising an adjustment drive which is disposed between the support unit and the actuator unit and by which the actuator unit is adjustable relative to the support unit, wherein the adjustment drive has a threaded spindle which engages in a spindle nut and has a spindle axis, and the spindle nut and the threaded spindle are drivable by a servomotor so as to rotate in a mutually relative manner, wherein the servomotor has a motor shaft which is coupled to a drive gear which is rotatable about a drive axis and which operatively engages directly or indirectly with an output gear which is rotatable about the spindle axis and is connected in a rotationally fixed manner to the spindle nut or the threaded spindle.

In some example steering columns disclosed herein, it is proposed that the drive axis and the spindle axis are disposed so as to be substantially mutually parallel.

The substantially parallel alignment is to be understood to mean that the drive axis and the spindle axis are aligned relative to the same axis direction, hereunder also referred to in short as the axial direction or the axis direction, at an angular deviation of less than +/−10°. In other words, the substantially parallel alignment is to be understood to be a maximum angle of ±10° between the spindle axis and the drive axis.

In one advantageous embodiment the drive axis and the spindle axis are disposed so as to be mutually parallel.

On account of the parallel disposal of the drive axis and the output axis according to the invention, the spatial width of the gearbox is substantially determined by the diameters of the drive gear and the output gear, and by using relatively small gear wheels can be accordingly optimized with a view to a narrow construction shape which extends in the axis direction. On account thereof, optimizing with a view to the shape and spatial dimensions of the installation space available in the vehicle for the steering column can take place, said installation space typically being tight, this not being implementable by way of the adjustment drives having mutually transverse axes, as previously known in the prior art. Consequently, more installation space can for example also be utilized for safety installations and the like, this enhancing the passenger safety of the vehicle.

A further advantage lies in that the mountings of the drive axis and the output axis have parallel bearing axes and on account thereof can be made and assembled with a lower complexity in terms of machining. This furthermore results in the advantage that the drive gear and the output gear can be assembled in the axis direction in the bearings, on account of which the complexity in assembling during the manufacturing of the adjustment drive is reduced.

The invention can be implemented in a submerged spindle drive as well as in a rotating spindle drive.

It is advantageous for the drive axis and the spindle axis to be disposed so as to be substantially parallel to the longitudinal axis. This embodiment in which the axis direction is aligned in the longitudinal direction of the actuator unit is particularly favorable with a view to the longitudinal adjustment. The entire adjustment drive according to the invention, which is of a particularly narrow or slim construction, respectively, can be fitted in a laterally parallel manner on the steering column which as a matter of principle is elongate in the longitudinal direction, such that the entire steering column is constructed so as to be narrower than in the prior art, on account of which the available installation space can be utilized in an optimized manner, and simpler assembling in the vehicle is enabled.

The drive gear and the output gear can preferably be configured as spur gears. A compact, efficient spur gearbox can be formed by way of mutually meshing spur gears or spur gear wheels. Alternatively, helical gears can be used instead of spur gears. The spacing between the gearbox axes, thus between the drive axis and the spindle axis, can be optimized by way of the dimensions of the operatively engaging gear wheels which can for example be configured having a relatively small diameter but so as to be wider in the axis direction, in order for higher torques to be transmitted, on account of which the construction shape which according to the invention is narrow in the axis direction can be readily maintained.

It can be provided that the motor shaft is disposed so as to be coaxial with the drive axis. On account thereof, it is possible for the drive gear to be attached directly on the motor shaft in a torque-fitting manner, for example as a spur gear or helical gear, or else for the spur gear toothing or the helical gear toothing to be configured so as to be integral on the motor shaft, on account of which a particularly compact construction mode is enabled.

One advantageous embodiment of the invention provides that an idler gear which is rotatable about an idler axis that is disposed so as to be substantially parallel to the drive axis and/or the spindle axis is disposed in the operative engagement between the drive gear and the output gear. The idler gear serves for transmitting moments and is in operative engagement with the drive gear and/or the output gear, for example by meshing with a spur gear toothing. It is conceivable and possible that one idler gear is used, on account of which the gearing ratio of the gearbox is determined only by the drive gear and the output gear, or else to use two different idler gears coupled to one another in a rotationally fixed manner on the idler axis in order to implement a gear stage, one of which engages with the drive gear and the other with the output gear. Here too, the substantially parallel alignment is to be understood to be a maximum angle of ±10° between the idler axis and the drive axis, or the spindle axis, respectively, wherein the idler axis is particularly preferably aligned so as to be exactly parallel to the spindle axis and/or to the drive axis.

The idler axis likewise extends in the axis direction, on account of which the advantages of a compact construction mode and simplified assembling are implemented as explained above in the context of the drive gear and the output gear. In other words, according to the invention all of the gearbox axes of the adjustment drive are aligned so as to be mutually parallel.

One advantageous embodiment provides that the idler axis is mounted so as to be displaceable transversely to the axis direction of the drive axis and the spindle axis. On account of the displacement, the idler gear disposed on the idler axis can in each case be moved in the radial direction, relative to the drive gear and to the output gear, thus in the case of spur gears in the direction of the meshing or counter thereto. It is possible for the operative engagement between the drive gear and the output gear to be set in an optimal manner by repositioning the idler gear, wherein the idler gear after reaching the optimal operative engagement, thus the optimal tooth flank clearance, is fixed such that said idler gear is rotatable but in terms of the position thereof is fixed in relation to to the drive gear and the output gear. The smoothness is increased and wear is minimized on account of the optimized meshing.

The displacement capability can be implemented in that the idler gear is mounted in a sliding block so as to be rotatable about the idler axis, said sliding block being mounted so as to be displaceable in a sliding guide. The sliding block can be moved along a sliding track in the sliding guide, for example in a sliding groove. The sliding guide can run in a linear or else arcuate manner transversely to the axis direction such that the idler gear attached to the idler axis can be moved relative to the drive gear and the output gear in a movement which is linear or arcuate in order for the meshing to be set. A sliding guide of this type can be reliably implemented with little complexity, and guarantees smooth running with little wear during the service life of the adjustment drive.

On account of the disposal of the idler axis so as to be parallel to the axis direction according to the invention, a sliding guide can be implemented in a simple manner, for example in the form of a sliding groove which is open in the axis direction. A sliding block which comprises the bearing of the idler axis can be readily inserted in the sliding groove in the axis direction, simpler assembling resulting on account thereof.

As an alternative to the sliding guide, the idler axis can be mounted on a swing arm which is mounted so as to be rotatable about a pivot axis which is disposed so as to be parallel to the idler axis. The bearing of the idler axis is disposed at a spacing from the swing arm bearing, and on account thereof can be pivoted in the direction toward the drive axis and/or spindle axis. On account thereof, the operative engagement between the drive gear, the output gear, and the idler gear can be set in a manner similar to that of the sliding guide.

It is advantageous for the idler axis to be supported so as to be sprung in a spring assembly. The sliding block is elastically held by way of at least one spring element of the spring assembly, such that the idler gear attached to the idler axis is pre-stressed in a sprung manner in the direction of the displacement capability transverse to the axis direction of the drive axis and the spindle axis. On account thereof, the idler gear is pushed in a sprung manner into the operative engagement, for example so as to engage in the toothing of the meshing gears. A clearance-free or low-clearance operative engagement results on account thereof, which leads to a high degree of smoothness and an optimized degree of efficiency. Any wear is compensated by the elastic readjustment on account of the spring assembly. Thanks to the spring assembly, the tooth flank clearance can be compensated or set to a desired level during operation.

The spring assembly can comprise compression springs and/or tension springs which are supported relative to the drive axis or the output axis, respectively, and elastically stress the idler axis, for example push the latter so as to engage in the toothing by way of a spring force. One advantageous embodiment has a retention ring which is designed, for example, so as to be hollow cylindrical for receiving a bearing, for example a roller bearing, and which has a spring element, for example in the form of a flexible tongue which projects in a radially outward manner. On account of the flexible tongue which is supported internally on a bearing receptacle of a gearbox housing, for example, the bearing and thus the idler axis mounted therein can be stressed in a sprung manner toward engaging in the tooting.

It can preferably be provided that the drive gear and the output gear and/or the idler gear are mounted at the end side in a gearbox housing. The gearbox housing serves for receiving and mounting at least the drive gear and the output gear, the drive axis and the spindle axis thereof according to the invention being disposed so as to be parallel, such that a bearing assembly which is readily accessible for assembling can be configured in an end side of the gearbox housing, and a bearing assembly which in the axis direction lies opposite can be configured in a gearbox cover which in the axis direction is placed onto the gearbox housing and is fastened thereto. The mounting for an idler gear and a sliding guide or the like can be implemented in a likewise axial manner at the end side. The compact construction shape which can be achieved, as well as the arrangement which is favorable in terms of manufacturing and assembling, are advantageous.

One advantageous refinement of the invention provides that exactly three gear wheels are present. As the first gear wheel herein, the drive gear is attached to the motor shaft of the servomotor, said drive gear being configured, for example as a worm and engaging in the idler gear which acts as the worm gear and represents the second gear wheel. The idler gear operatively engages with the output gear which is connected to the spindle nut, said output gear representing the third gear wheel. In one advantageous embodiment of this gearbox assembly, the output gear which is connected to the spindle nut has a spur toothing in which the teeth which are configured so as to be straight run parallel to the spindle axis of the threaded spindle, the tooth flanks thus also extending in the direction of the spindle axis. The spur toothing is particularly preferably configured as an involute tooting. On account thereof, no axial forces, or significantly reduced axial forces, in the direction of the output axis are transmitted to the spindle nut when being driven. The idler gear can have a spiral toothing which engages in said spur toothing, wherein the axis of the idler gear, the idler axis, is disposed so as to be offset in angular terms, thus inclined, in relation to the drive axis of the drive gear and in relation to the output axis of the output gear. The drive axis and the output axis G can be disposed so as to be mutually parallel. A high degree of smoothness and a high degree of efficiency of transmitting moments can be implemented on account of the inclined disposal of the idler gear and the configuration of the output gear with a spur toothing.

In an alternative, advantageous refinement the drive gear and the output gear are configured as belt pulleys and are operatively connected to one another by way of a traction means. The traction means is preferably configured as a belt, particularly preferably as a timing belt. However, it is likewise conceivable and possible for the traction means to be configured as a chain, wherein the drive gear and the output gear in this instance are correspondingly configured as chain sprockets.

Figure 1:
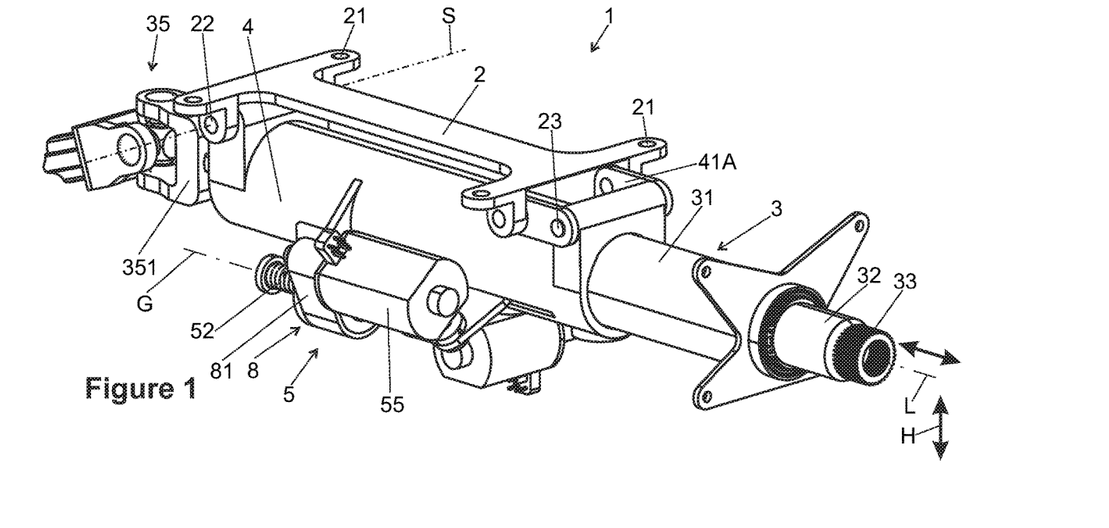
FIG. 1 is a schematic perspective view of a steering column having an electric adjustment.
Figure 2:
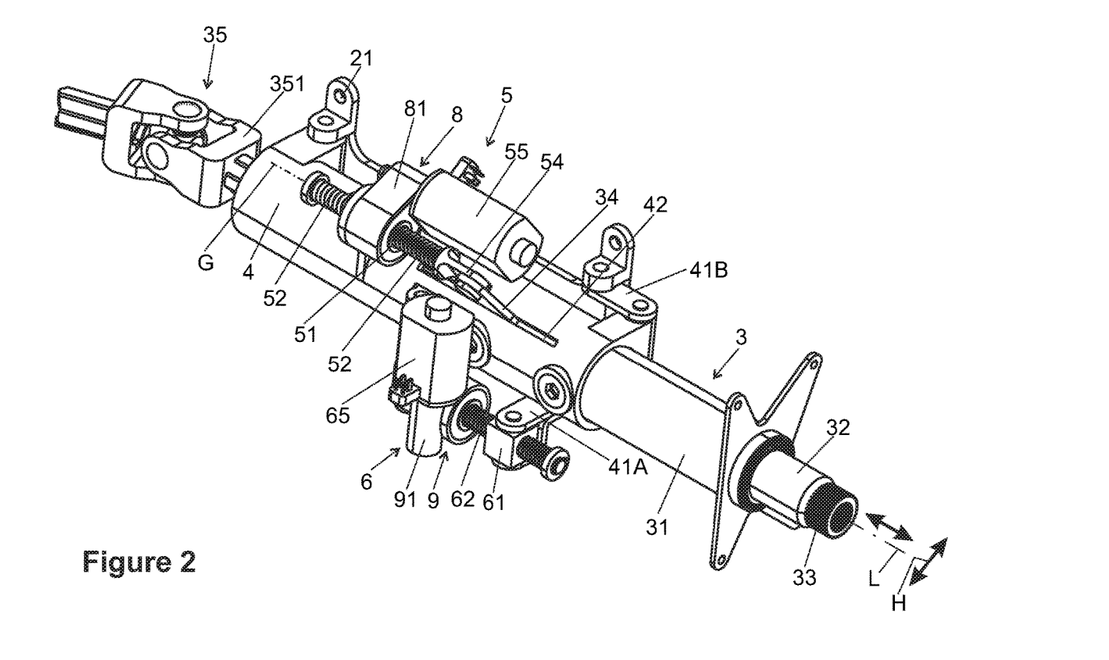
FIG. 2 is a perspective view of the steering column from FIG. 1.

FIG. 1 shows a steering column 1 according to the invention in a schematic perspective view from obliquely above onto the rear end in terms of the travel direction of a vehicle (not illustrated), wherein a steering wheel (not illustrated here) is held in the operating region. FIG. 2 shows the same steering column 1 when seen in a view from obliquely below.

The steering column 1 comprises a support unit 2 which is configured as a bracket which has fastening means 21 in the form of fastening bores for attaching to a vehicle body (not illustrated). An actuator unit 3 which is received in a casing unit 4, also referred to as a guide box or a boxed swing arm, is held by the support unit 2.

The actuator unit 3 has a casing tube 31 in which a steering spindle 32 is mounted so as to be rotatable about a longitudinal axis L which extends axially in the longitudinal direction, that is to say in the direction of the longitudinal axis L. A fastening portion 33 is configured on the rear end on the steering spindle 32, a steering wheel (not illustrated) being attachable to said fastening portion 33. The steering spindle 32 at the front end is connected in a torque-fitting manner to a yoke 351 of a universal joint 35.

The actuator unit 3 for implementing a longitudinal adjustment is received in the casing unit 4 so as to be displaceable in a telescopic manner in the direction of the longitudinal axis L, so as to be able to position the steering wheel that is connected to the steering spindle 32 back and forth in the longitudinal direction relative to the support unit 2, as is indicated by the double arrow parallel to the longitudinal axis L.

The casing unit 4 in the front end region thereof is mounted in a pivot bearing 22 on the support unit 2 so as to be pivotable about a horizontal pivot axis S which lies so as to be transverse to the longitudinal axis L. In the rear region, the casing unit 4 is connected to the support unit 2 by way of a rotatable actuator lever 41A, 41B. The casing unit 4 by way of a rotating movement of the actuator lever 41A, 41B by means of an illustrated actuator drive 6 (see FIG. 2) can be pivoted relative to the support unit 2 about the pivot axis S which in the installed state is horizontal, on account of which an adjustment of a steering wheel that is attached to the fastening portion 33 can be performed in the height direction H, this being indicated by the double arrow.

A first adjustment drive 5 for the longitudinal adjustment of the actuator unit 3 relative to the casing unit 4 in the direction of the longitudinal axis L has a spindle drive having a spindle nut 51 having an internal thread, a threaded spindle 52, also referred to in short as spindle 52, which extends along a threaded spindle axis G, also referred to in short as spindle axis G, engaging in said internal thread, said spindle 52 by way of the external thread thereof thus being screwed into the corresponding internal thread of the spindle nut 51. The threaded spindle axis G of the threaded spindle 52 runs so as to be substantially parallel to the longitudinal axis L.

The spindle nut 51 is mounted in a gearbox housing 81 so as to be rotatable about the spindle axis G in a gearbox 8, said gearbox housing 81 being fixedly connected to the casing unit 4. The spindle nut 51 in the direction of the threaded spindle axis G, which hereunder is also referred to synonymously as the spindle axis G, is axially supported on the casing unit 4 by way of the gearbox housing 81, as is yet to be explained in more detail hereunder.

The threaded spindle 52 by way of a fastening element 54 configured on the rear end of said threaded spindle 52 is connected to the actuator unit 3 by way of a transmission element 34, specifically so as to be fixed in the direction of the threaded spindle axis G, or the longitudinal axis L, respectively, and so as to be stationary in relation to a rotation about the threaded spindle axis G. A so-called submerged spindle drive is implemented on account of the spindle nut 51 which is drivable in a rotating manner, and the threaded spindle 52 which is stationary in relation to a rotation about the spindle axis G.

As can be derived from FIG. 2, the transmission element 34 extends from the actuator unit 3 through a slot-shaped passage opening 42 in the casing unit 4. In order for the steering column 1 to be adjusted in the longitudinal direction, the transmission element 34 can be freely moved along in the longitudinal direction in the passage opening 42.

The adjustment drive 5 has an electric servomotor 55 by which the spindle nut 51 in terms of the threaded spindle axis G is drivable in a rotating manner relative to the stationary threaded spindle 52. On account thereof, depending on the rotating direction of the servomotor 55, the threaded spindle 52 in the direction of the axis G can be repositioned in a translatory manner relative to the spindle nut 51 such that the actuator installation 3 that is connected to the threaded spindle 52 is accordingly adjusted in the direction of the longitudinal axis L, relative to the casing unit 4 that is connected to the spindle nut 51. The drive of the spindle nut 51 is yet to be explained in more detail hereunder.

It can furthermore be seen in FIG. 2 how a second adjustment drive 6 for adjustment in the height direction H is attached to the steering column 1. This adjustment drive 6 comprises a spindle nut 61, a threaded spindle 62 engaging along a threaded spindle axis in the internal thread of said spindle nut 61. The adjustment drive 6 has a gearbox 9 in which the threaded spindle 62 is mounted in a gearbox housing 91, which is fastened to the casing unit 4, so as to be rotatable about the threaded spindle axis, which is referred to synonymously as the gearbox axis, said threaded spindle 62 in the direction of the threaded spindle axis being axially supported on the casing unit 4. The threaded spindle 62 is selectively drivable by an electric servomotor 65 so as to rotate in both rotating directions about the threaded spindle axis of said threaded spindle 62.

The spindle nut 61 in terms of a rotation about the threaded spindle axis is attached so as to be stationary on one end of the dual-arm actuator lever 41A which is mounted on the support unit 22 so as to be rotatable about a pivot bearing 23, and the other arm of said actuator lever 41A by way of the other end being connected to the casing unit 4.

Depending on the rotating direction of the servomotor 65, the spindle nut 61 by rotating the threaded spindle 62 can be repositioned in a translatory manner in the direction of the threaded spindle axis relative to the threaded spindle 62 such that the casing unit 4 which by way of the actuator lever 41A is connected to the spindle nut 61, including the actuator installation 3 received in said casing unit 4, in the height direction H can be correspondingly adjusted upward or downward relative to the support unit 2, as is indicated by the double arrow.

A so-called rotating spindle drive is implemented on account of the threaded spindle 62 that is drivable in a rotating manner and the spindle nut 61 which is stationary in terms of rotation.

The present invention relates to the design embodiment of the gearbox 8 which will be explained in detail by means of the illustrations in FIGS. 3 to 10 and FIG. 12. The spindle nut 51 in the gearbox housing 81 is mounted so as to be fixed in the axial direction and so as to be rotatable about the respective spindle axis G, and the threaded spindle 52 is attached in a non-rotatable manner, on account of which a submerged spindle drive is implemented. The threaded spindle 62 in the gearbox 9 is drivable in a rotating manner, on account of which a rotating spindle drive is formed.

Embodiments of the gearbox 8 of the adjustment drive 5 configured as a submerged spindle drive will be explained in an exemplary manner hereunder by means of FIGS. 3 to 9, wherein the features can also be applied in an analogous manner to the design embodiment of a gearbox 8 for an adjustment drive configured as a rotating spindle drive in that the threaded spindle 52, instead of the spindle nut 51, is drivable in a rotating manner.

Figure 3:
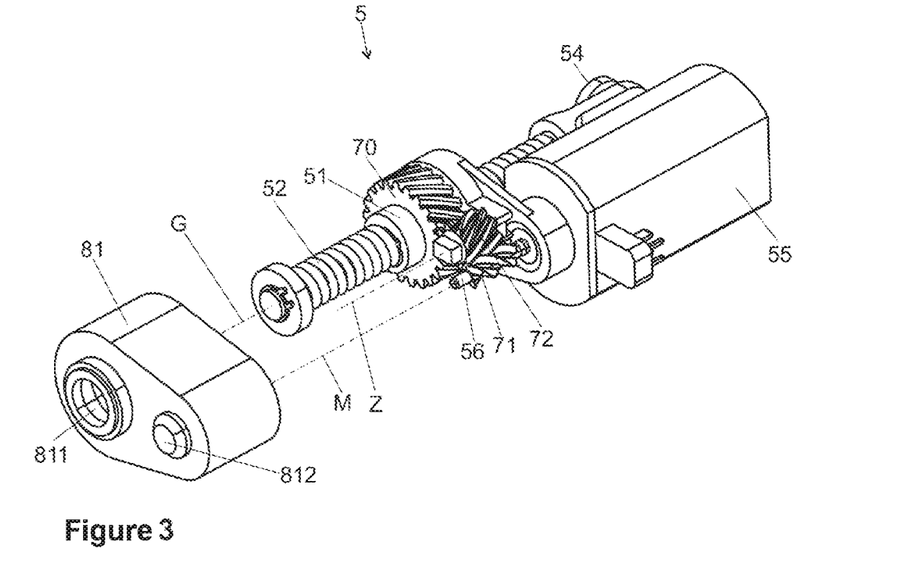
FIG. 3 is a perspective view of the adjustment drive for longitudinally adjusting the steering column according to FIG. 1, in an exploded state.
Figure 4:
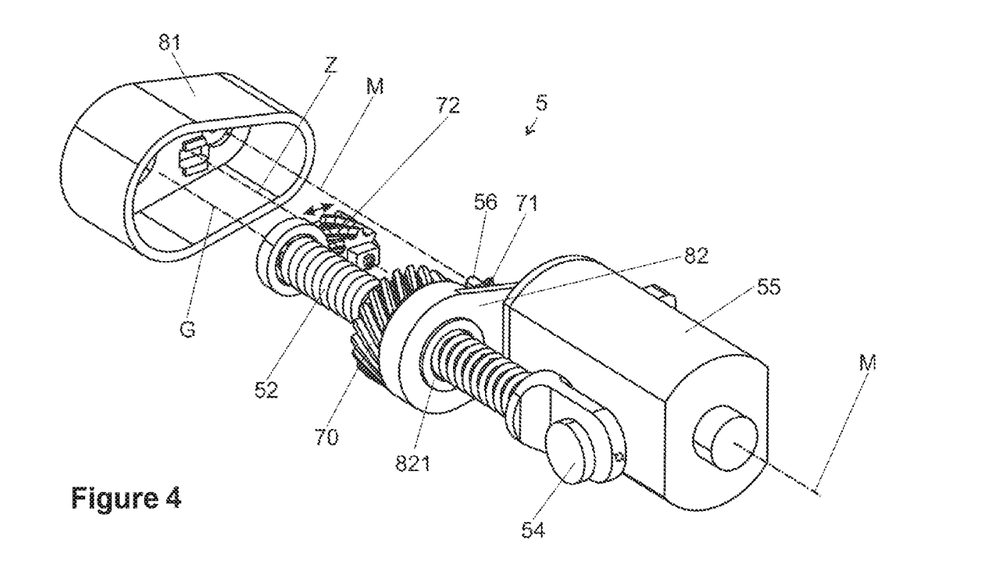
FIG. 4 is a perspective view of the adjustment drive according to FIG. 3.

FIG. 3 and FIG. 4 show the adjustment drive 5 in two schematic perspective views from different viewing angles, wherein the gearbox 8 is illustrated so as to be pulled apart in the longitudinal direction in which the longitudinal axis L and also the spindle axis G extend.

The gearbox housing 81 has a bearing cover 82 on which the servomotor 55 is fastened and which in the assembled state closes the gearbox housing 81 at the end side, at the motor-proximal side.

The spindle nut 51 is connected in a rotationally fixed manner to a drive gear 70 which is configured as a gear wheel, in the example shown as a helically toothed gear. The spindle nut 51 and the drive gear are preferably a single-part integral component which is formed from a plastics material. The drive gear 70 in the gearbox housing 81 is rotatably mounted in a bearing 811, and in the bearing cover 82 is rotatably mounted in a bearing 821.

Figure 5:
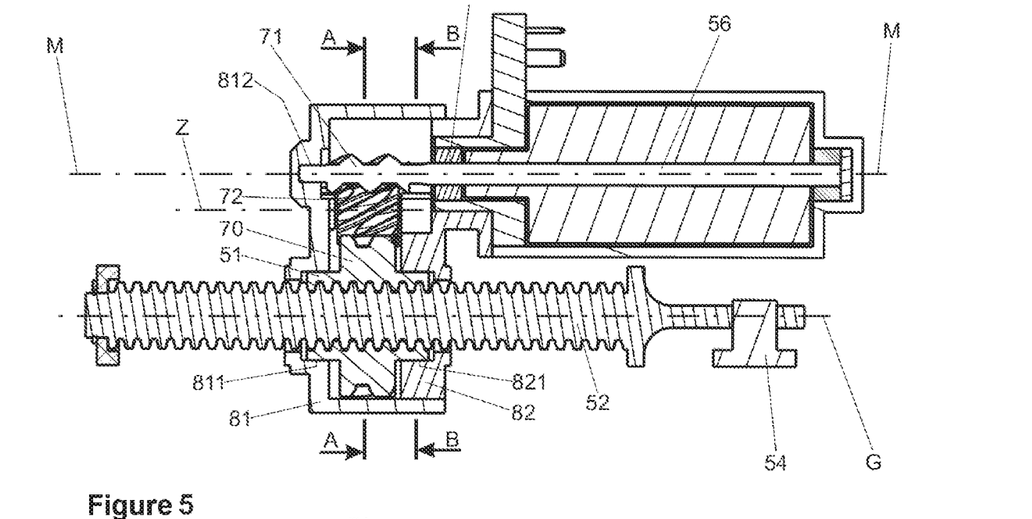
FIG. 5 is a longitudinal sectional view along the drive axis and output axis through the adjustment drive according to FIGS. 3 and 4.

FIG. 5 shows a longitudinal section through the adjustment drive 5 in a section plane in which the threaded spindle axis G and the drive axis (motor axis) M lie. A drive gear 71, configured as a helical gear with three teeth, is attached to a motor shaft 56 of the servomotor 55, said motor shaft 56 extending on the drive axis M and therefore being referred to synonymously as the drive shaft 56. The drive gear 71 in the example shown is configured so as to be integral to the driveshaft 56, wherein the toothing is incorporated directly in the driveshaft 56 such that the drive gear 71 can have a relatively small diameter, this lending itself to a compact construction shape.

The driveshaft 56 on the motor side is mounted in a bearing 822 which at the end side is disposed in the bearing cover 82, and at the end side in the gearing housing 81 is mounted in a bearing 812.

The threaded spindle axis G and the drive axis (motor axis) M lie so as to be substantially mutually parallel, within an angular deviation of +/−10°, and likewise so as to be substantially parallel to the longitudinal axis L.

The drive gear 71 engages in the toothing of an idler gear 72 which is configured as a helical gear and meshes with the output gear 70. The idler gear 72 is disposed so as to be rotatable on an idler shaft 73 which extends in the direction of an idler axis Z. The idler axis Z lies so as to be parallel to the drive axis (motor axis) M and to the output axis (spindle axis) G.

On account of the idler gear 72 being integrated so as to mesh between the drive gear 71 and the output gear 70, said idler gear ensures a rotating drive of the spindle nut 51 in the same rotating direction as the motor shaft 56, wherein the gearing ratio is determined by the tooth counts of the drive gear 71, the output gear 70, and idler gear 72.

Figure 6:
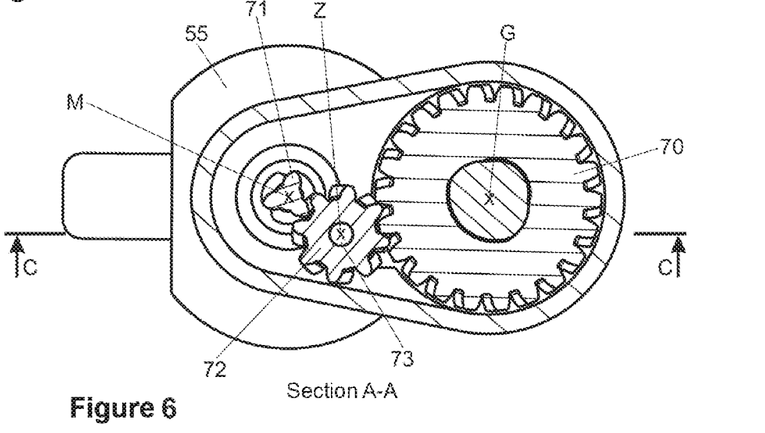
FIG. 6 is a cross section A-A through the adjustment drive according to FIG. 5.

The gearbox assembly in which the drive gear 71, the idler gear 72, and the output gear 70 are in mutual operative engagement can be clearly seen from the cross-sectional view of FIG. 6.

The idler gear 72 by way of the idler axis Z thereof is mounted so as to be displaceable transversely to the drive axis M and to the spindle axis G. To this end, a groove-type or rail-type sliding guide 74 is configured in the gearing housing 81 and the bearing cover 82, a sliding block 75 being mounted so as to be displaceable in a sliding manner in the guiding direction F, which is indicated by a double arrow. The idler shaft 73 in the sliding block 75 is mounted about the idler axis Z such that the idler gear 72 is displaceable relative to the output gear 70 and the drive gear 71 transversely to the axis direction. On account thereof, said idler gear 72 can be moved so as to engage in the toothing of the drive gear 71 and the output gear 70.

Figure 10:
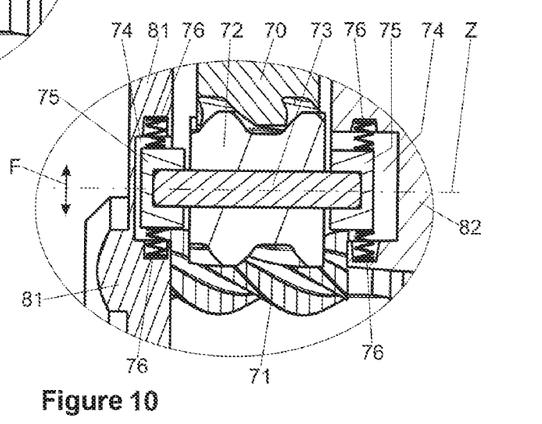
FIG. 10 is a detailed view as in FIG. 8 of a further embodiment.

In order to generate a clearance-free, or low-clearance, respectively, engagement in the toothing during operation, the idler gear 72 can be elastically stressed transversely to the axis direction, in the guiding direction F of the sliding guide 74, by a spring assembly having one or a plurality of spring elements 76, as is illustrated in FIG. 10. On account thereof, the idler gear 72 by way of the helical toothing thereof is held by the spring force in a sprung manner relative to the toothing of the output gear 70 and of the drive gear 71, on account of which tooth flank clearance in the operation can be compensated or be set to a desirable level. Smoothness is enhanced and wear is reduced on account thereof.

Figure 11:
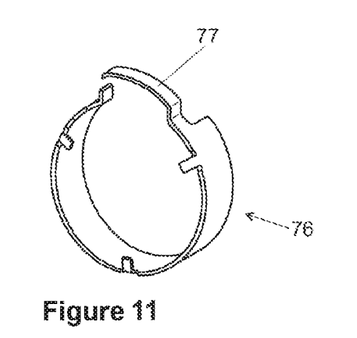
FIG. 11 is a schematic perspective view of a spring element.

The spring assembly can be implemented, for example, by means of a spring element 76 as is individually illustrated in FIG. 11. Said spring element 76 is configured in the form of a tubular-cylindrical ring from spring steel sheet which is circumferentially open, in which by way of example a roller bearing or a bearing bush configured as a friction bearing can be received. The spring element 76 can have a flexible tongue 77 which projects in a radially outward manner and which can be supported on the bearing housing 81 or the bearing cover 82, and in this way ensures an elastic mounting of the idler axis Z relative to the drive axis M and to the output axis G.

Figure 7:
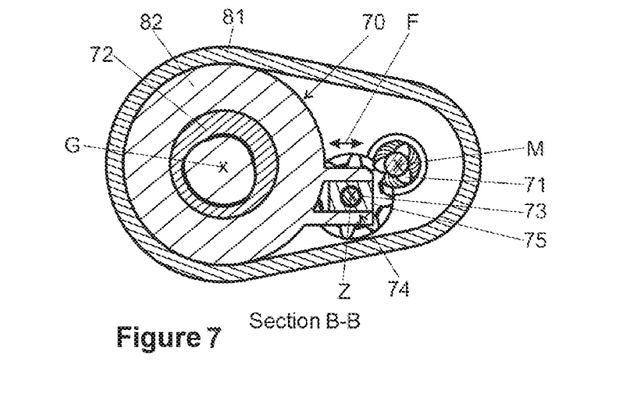
FIG. 7 is a cross section B-B through the adjustment drive according to FIG. 5.
Figure 8:
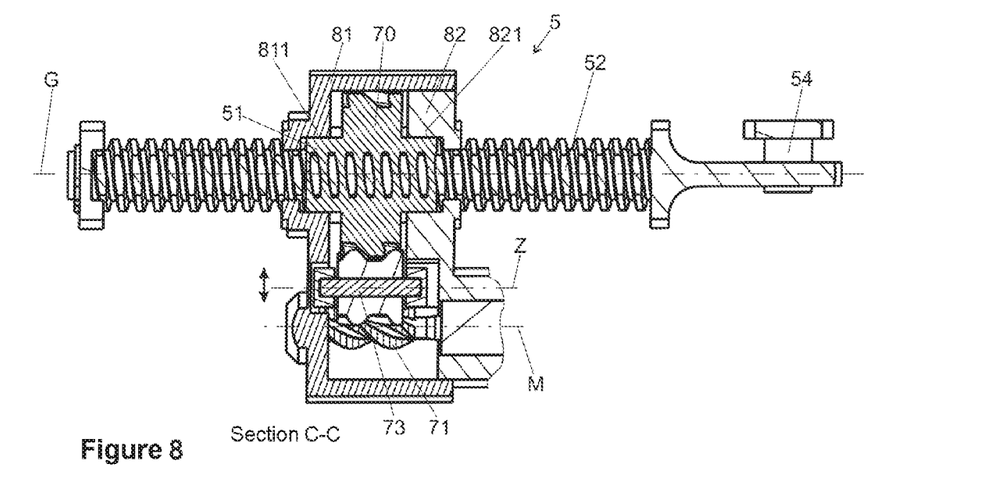
FIG. 8 is a longitudinal section C-C through the adjustment drive according to FIG. 6.
Figure 9:
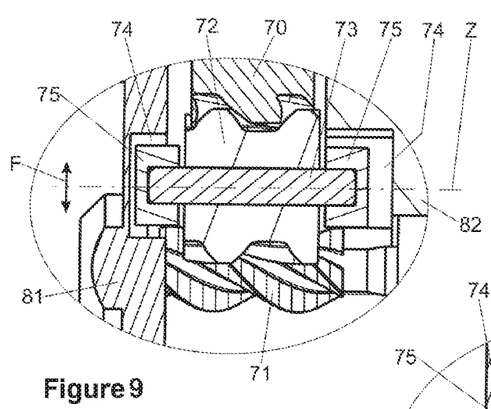
FIG. 9 is a detailed view of the idler gear from FIG. 8.

It is derived from the views in the axis direction of FIGS. 6 and 7 that the entire assembly of the adjustment drive 5, including the servomotor 55 and the gearbox housing 81, is of a construction which transversely to the longitudinal direction is relatively narrow. As can be seen in FIGS. 1 and 2, the adjustment drive 5 can have a snug fit on the steering column 1, so to speak, such that said steering column 1 has a particularly narrow construction shape in order for the installation space to be utilized in an optimal manner.

Figure 12:
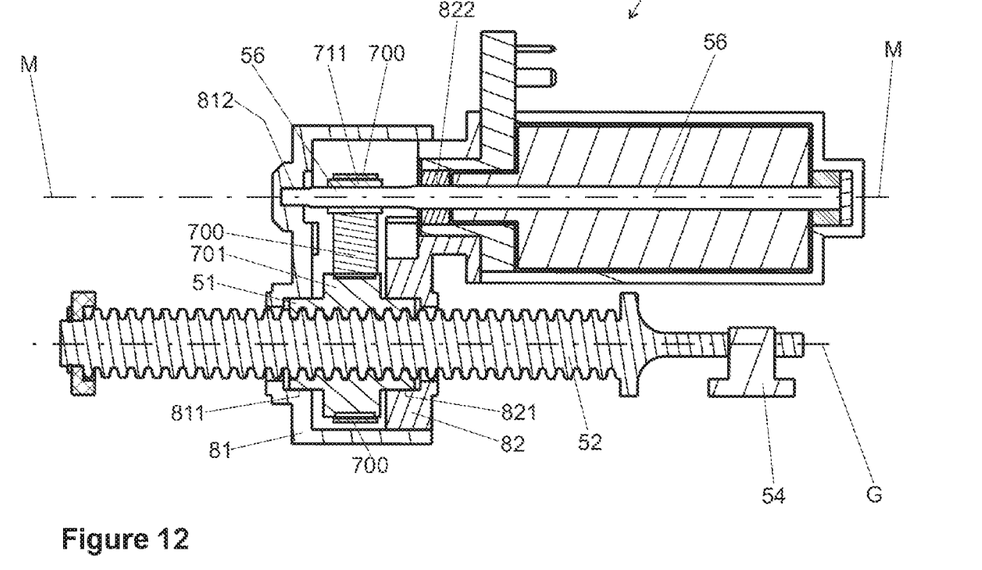
FIG. 12 is a longitudinal sectional view along the drive axis and output axis through an adjustment drive in a further embodiment.

FIG. 12 shows a longitudinal section through the adjustment drive 5 in a further embodiment, in a section plane in which the threaded spindle axis G and the drive axis (motor axis) M lie. A drive gear 711 configured as a belt pulley is attached to a motor shaft 56 of the servomotor 55, said motor shaft 56 extending on the drive axis M and therefore being referred to synonymously as the driveshaft 56. The output gear 701 configured as a belt pulley is coupled in a torque-fitting manner to the spindle nut 51, wherein the output gear 701 and the spindle nut 51 in this embodiment is configured as a single-part integral component. The spindle nut 51 operatively engages in the threaded spindle 52, wherein the threaded spindle 52 by rotation of the spindle nut 51 is moved in a translatory manner in the direction of the threaded spindle axis G. The interaction of the spindle nut 51 and the threaded spindle 52 corresponds to that of the embodiments previously illustrated. The only point of differentiation lies in that the output gear 701 and the drive gear 711 are coupled to one another in a torque-fitting manner by way of a traction means 700 configured as a timing belt. Smooth running of the adjustment drive 5 with little noise can be implemented thanks to the traction means 700. The adjustment drive illustrated in FIG. 12 can likewise be embodied as a rotating spindle drive in that the output gear configured as a belt pulley is coupled in a rotationally fixed manner to the threaded spindle, and the threaded spindle is thus set in rotation when the drive gear is driven by the servomotor and the torque is transmitted to the output gear by means of the traction means.

Figure 13:
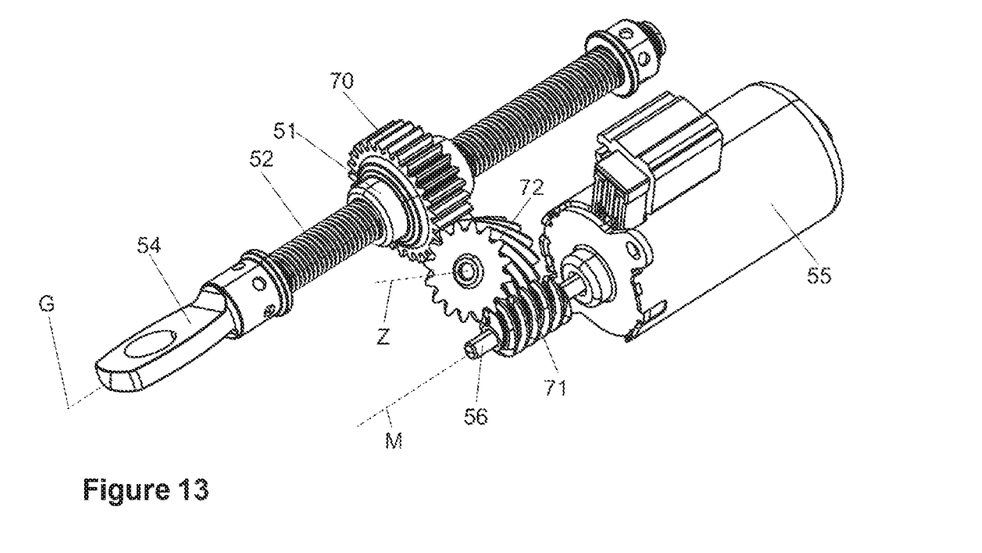
FIG. 13 is a schematic view of an adjustment drive in a further embodiment.

A third embodiment of an adjustment drive 5 according to the invention in which the gearbox housing has been omitted for improved clarity is illustrated in a schematic perspective view in FIG. 13. As in the preceding embodiments, the drive gear 71, which is configured as a worm and meshes with the idler gear 72 that acts as a worm gear, is attached to the motor shaft 56 of the servomotor 55. The idler gear 72 operatively engages with the output gear 70, which is configured as a spur gear. It is a particularity of this gearbox assembly that the output gear 70 that is connected to the spindle nut 51 has a spur toothing, that is to say that the teeth thereof which are configured so as to be straight run parallel to the output axis G of the threaded spindle 52. The teeth thus extend so as to be parallel to the spindle axis G. On account thereof, no axial forces, or significantly reduced axial forces, in the direction of the output axis G are transmitted to the spindle nut 51 when being driven. The idler gear 72 has a helical toothing engaging therein, wherein the idler axis Z, as opposed to the previously described embodiments, does not run so as to be parallel to the drive axis (motor axis) M and to the output axis (spindle axis) G, but is disposed so as to be offset in angular terms, thus inclined, in relation to the drive axis M and to the output axis G. The drive axis M and the output axis G can be disposed so as to be mutually parallel, as illustrated. The idler gear 72 in the gearbox housing (not illustrated) is mounted so as to be rotatable about the idler axis Z, as has already been explained in the context of the other embodiments. In a modification of the embodiment of FIG. 13 which is not illustrated, clearance-free, or low-clearance, respectively, meshing in the operation can be achieved in that the idler gear 72 is elastically stressed transversely to the axis direction by a spring assembly having one or a plurality of spring elements. The resilient action of the idler gear 72, such as is illustrated in FIG. 10 for example, can thus also be used in a simple manner in an embodiment as is illustrated in FIG. 13.

A high degree of smoothness and a high degree of efficiency in transmitting moments can be implemented on account of the inclined disposal of the idler gear 72 and the configuration of the output gear 70 with a spur toothing.

LIST OF REFERENCE SIGNS

1 Steering column
2 Support unit
21 Fastening means
22, 23 Pivot bearing
3 Actuator unit
31 Casing tube
32 Steering spindle
33 Fastening portion
34 Transmission element
4 Casing unit
41 Actuator lever
42 Passage opening
5, 6 Adjustment drive
51, 61 Spindle nut
52, 62 Threaded spindle
54 Fastening element
55, 65 Servomotor
56 Motor shaft (drive shaft)
700 Worm
700 Traction means
70, 701 Output gear
71, 711 Drive gear
72 Idler gear
73 Idler shaft
74 Sliding guide
75 Sliding block
76 Spring element
77 Flexible tongue
8, 9 Gearbox
81, 91 Gearbox housing
811, 812 Bearing
82 Bearing cover
821, 822 Bearing
L Longitudinal axis
H Height direction
G Threaded spindle axis (spindle axis)
M Drive axis (motor axis)
Z Idler axis

What is claimed is:

1. A steering column for a motor vehicle, comprising:
a support unit configured to attach to a vehicle body;
an actuator unit attached to the support unit;
a steering spindle mounted within the actuator unit and configured to rotate about a longitudinal axis; and
an adjustment drive disposed between the support unit and the actuator unit and configured to adjust the position of the actuator unit relative to the support unit;
wherein the adjustment drive has a threaded spindle which engages in a spindle nut and has a spindle axis;
a servomotor configured to drive the spindle nut and the threaded spindle to rotate in a mutually relative manner;
wherein the servomotor has a motor shaft which is coupled to a drive gear which is rotatable about a drive axis and which operatively engages with an output gear which is rotatable about the spindle axis and is connected in a rotationally fixed manner to the spindle nut or the threaded spindle;
an idler gear that is rotatable about an idler axis that is disposed so as to be substantially parallel to the drive axis and/or the spindle axis, the idler gear disposed in operative engagement between the drive gear and the output gear, wherein the idler axis is mounted so as to be displaceable transversely to the axis direction of the drive axis and the spindle axis,
wherein the drive axis and the spindle axis are disposed so as to be substantially mutually parallel.

2. The steering column of claim 1 wherein the drive axis and the spindle axis are disposed so as to be substantially parallel to the longitudinal axis.

3. The steering column of claim 1 wherein the drive gear and the output gear are spur gears.

4. The steering column of claim 1 wherein the motor shaft is coaxial with the drive axis.

5. The steering column of claim 1 wherein the idler axis is substantially parallel to the drive axis and the spindle axis.

6. The steering column of claim 1 wherein the idler gear is mounted in a sliding block so as to be rotatable about the idler axis, said sliding block being mounted so as to be displaceable in a sliding guide.

7. The steering column of claim 1 wherein the idler axis is held so as to be sprung in a spring assembly.

8. The steering column of claim 1 wherein the drive gear, the output gear, and an idler gear are mounted at an end side in a gearbox housing.

9. The steering column of claim 1 wherein the drive gear and the output gear are belt pulleys that are operatively connected by way of a traction means.

10. A steering column for a motor vehicle, the steering column comprising:
a support unit configured to attach to a vehicle body;
an actuator unit attached to the support unit;
a steering spindle mounted within the actuator unit and configured to rotate about a longitudinal axis;
an adjustment drive configured to adjust the position of the actuator unit relative to the support unit, wherein the adjustment drive has a threaded spindle that has a spindle axis and engages in a spindle nut; and
a servomotor configured to cause the spindle nut and the threaded spindle to rotate relative to one another, wherein the servomotor has a motor shaft that is coupled to a drive gear that is rotatable about a drive axis and operatively engages with an output gear that is rotatable about the spindle axis and is connected in a rotationally fixed manner to the spindle nut or the threaded spindle, with the drive axis and the spindle axis being substantially parallel, wherein the spindle nut and the output gear are integral.

11. The steering column of claim 10 comprising a transmission element that couples the threaded spindle directly to the actuator unit.

12. The steering column of claim 11 wherein the transmission element extends through an elongated slot in a casing unit that is disposed around a portion of the actuator unit.

13. The steering column of claim 10 comprising:
an idler gear disposed in operative engagement between the drive gear and the output gear, wherein the idler gear is mounted so as to be displaceable transversely to the drive axis and to the spindle axis; and
a spring assembly that biases the idler gear.

14. The steering column of claim 13 wherein the spring assembly comprises a flexible tongue that projects in a radially outward manner to ensure an elastic mounting of an axis of the idler gear relative to the drive axis and the output axis.

15. The steering column of claim 10 wherein the integral spindle nut-output gear is comprised of plastic.

16. A steering column for a motor vehicle, the steering column comprising:
a support unit configured to attach to a vehicle body;
an actuator unit attached to the support unit;
a steering spindle mounted within the actuator unit and configured to rotate about a longitudinal axis;
an adjustment drive configured to adjust the position of the actuator unit relative to the support unit, wherein the adjustment drive has a threaded spindle that has a spindle axis and engages in a spindle nut;
a servomotor configured to cause the spindle nut and the threaded spindle to rotate relative to one another, wherein the servomotor has a motor shaft that is coupled to a drive gear that is rotatable about a drive axis and operatively engages with an output gear that is rotatable about the spindle axis and is connected in a rotationally fixed manner to the spindle nut or the threaded spindle, with the drive axis and the spindle axis being substantially parallel; and
an idler gear disposed in operative engagement between the drive gear and the output gear, wherein the idler gear is configured as a helical gear and the output gear is configured as a spur gear with teeth that are parallel to the spindle axis.

17. The steering column of claim 16 wherein the adjustment drive is configured to translate the actuator unit relative to the support unit, wherein the drive axis and the spindle axis are offset and not coaxial.

18. The steering column of claim 16 wherein the idler gear is mounted in a sliding block so as to be rotatable about an idler axis, said sliding block being mounted so as to be displaceable in a sliding guide.

19. The steering column of claim 16 wherein an idler axis of the idler gear is transverse relative to both the spindle axis and the drive axis.

20. The steering column of claim 16 wherein an idler axis of the idler gear is mounted on a swing arm that is mounted so as to be rotatable about a pivot axis that is parallel to the idler axis.

* * * * *